United States Patent Office 3,293,248
Patented Dec. 20, 1966

3,293,248
ISOCYANURATE-TRIANHYDRIDE POLYMER
Howard E. Sheffer, Burnt Hills, N.Y., assignor to Schenectady Chemicals, Inc., Schenectady, N.Y., a corporation of New York
No Drawing. Filed Dec. 4, 1964, Ser. No. 416,105
3 Claims. (Cl. 260—248)

This invention relates to carboxylic acid anhydrides.

It is an object of the present invention to prepare novel polycarboxylic acid anhydrides.

Another object is to prepare polycarboxylic acid anhydrides having a heterocyclic nitrogen containing ring.

Still further objects and the entire scope of applicability of the present invention will become apparent from the detailed description given hereinafter; it should be understood, however, that the detailed description and specific examples, while indicating preferred embodiments of the invention are given by way of illustration only, since various changes and modifications within the spirit and scope of the invention will become apparent to those skilled in the art from this detailed description.

It has now been found that these objects can be attained by reacting one mole of a tris hydroxyalkyl isocyanurate alkanoate or benzoate or the like with 3 moles of trimellitic anhydride to produce tris hydroxyalkyl trimellitic anhydride tris ester. The equation for the reaction is as follows:

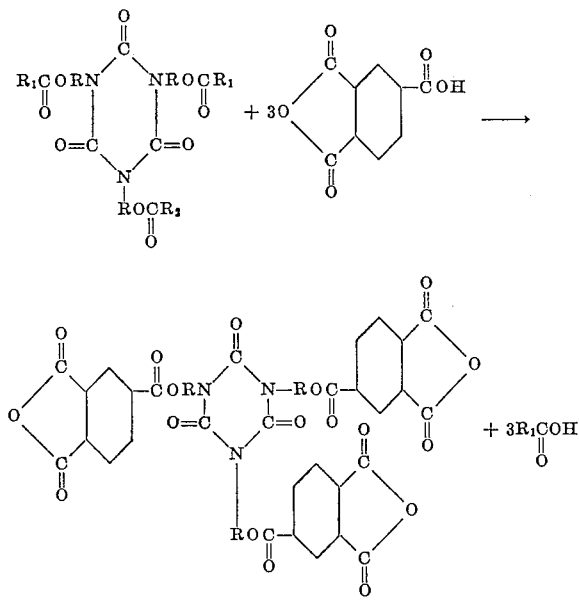

where R is a lower alkylene radical having at least one carbon atom and having the formula $C_nH_{2n}$, e.g., methylene, ethylene, propylene and butylene and $R_1$ is alkyl or carbocyclic aryl. An excess of the trimellitic anhydride or the isocyanurate can be used but it is not necessary to do so and preferably 1 mole of the isocyanurate is used with 3 moles of the trimellitic anhydride.

The reaction is preferably carried out in the presence of a high boiling diluent, e.g., diphenyl ether, diphenyl, acenaphthene, phenanthrene and dioctyl ether. The alkanoic acid or aromatic monocarboxylic acid formed as the byproduct is removed by distillation during the reaction.

The starting material, namely, the tris hydroxyalkyl isocyanurate alkanoate or benzoate or the like is formed by heating tris hydroxyalkyl isocyanurate with an excess of the appropriate acid until complete esterification results. Thus there can be used 6 moles of the acid per mole of the tris hydroxyalkyl isocyanurate.

The hydroxyalkyl isocyanurates can be prepared as set forth in Little Patent 3,088,948. Thus there can be used tris hydroxyethyl isocyanurate (also called tris-2-hydroxyethyl isocyanurate), tris-2-hydroxypropyl isocyanurate, tris-2-hydroxybutyl isocyanurate and tris hydroxymethyl isocyanurate. The preferred isocyanurate is the 2-hydroxyethyl isocyanurate. As the acid there can be used acetic acid, propionic acid, formic acid, butyric acid, isobutyric acid, valeric acid, trimethyl acetic acid, caproic acid, caprylic acid, benzoic acid, o-toluic acid, m-toluic acid and p-toluic acid.

The preferred isocyanurate ester is the tri ester prepared from acetic acid and tris hydroxyethyl isocyanurate.

Examples of isocyanurate esters are the triacetate of tris hydroxyethyl isocyanurate, the triacetate of tris-2-hydroxypropyl isocyanurate, the triacetate of tris-2-hydroxybutyl isocyanurate, the tripropionate of tris hydroxyethyl isocyanurate, the tributyrate of tris hydroxyethyl isocyanurate, the tribenzoate of tris hydroxyethyl isocyanurate, the tri caprylate of tris hydroxyethyl isocyanurate, the tri propionate of tris-2-hydroxypropyl isocyanurate and the triacetate of trihydroxymethyl isocyanurate.

The products of the invention include the ester from 3 moles of trimellitic anhydride and 1 mole of tris hydroxyethyl isocyanurate, the ester from 3 moles of trimellitic anhydride and 1 mole of tris-2-hydroxypropyl isocyanurate; the ester from 3 moles of trimellitic anhydride and 1 mole of tris-2-hydroxybutyl isocyanurate and from 3 moles of trimellitic anhydride and 1 mole of tris hydroxymethyl isocyanurate. (While the products for example are referred to as esters from trimellitic anhydride and tris-2-hydroxyethyl isocyanurate, they are actually prepared by a transesterification process, e.g., trimellitic anhydride is reacted with the triacetate of tris hydroxyethyl isocyanurate.)

Unless otherwise indicated all parts and percentages are by weight.

The compounds of the present invention are useful as curing agents for epoxy resins, e.g., bisphenol A-epichlorhydrin resins, as curing agents for melamine-formaldehyde and urea-formaldehyde resins.

They also can be used alone or together with a dianhydride (e.g. one prepared from the diacetate of methylene dianiline and trimellitic anhydride) to form polyester-polyamic acid (alone) or polyester-polyamide-polyamic acid (together). Thus two moles of the trianhydride prepared from tris hydroxyethyl isocyanurate and trimellitic anhydride can be heated with 3 moles of methylene dianiline to form the polyester polyamic acid or 1 mole of this trianhydride and 3 moles of the dianhydride prepared from the diacetate of methylene dianiline and trimellitic anhydride can be heated with 4.5 moles of methylene dianiline (or other aromatic polyamide) to form a polyester polyamide-polyimide. These polyester-polyimides and polyester-polyamide-polyimides are useful as coatings for electrical conductors and in coating metal and wood surfaces.

Example

The triacetate of tris hydroxyethyl isocyanurate was prepared by refluxing excess acetic acid (6 moles of acetic acid) with 1 mole of tris hydroxyethyl isocyanurate until completely esterified. The excess acetic acid was then removed by distillation.

To 1 mole of the triacetate of tris hydroxyethyl isocyanurate there were added 3 moles of trimellitic anhydride and 600 grams of diphenyl ether as a diluent. The batch was heated for two hours at a pot temperature of 300° C. while acetic acid was distilled out.

The product was precipitated by adding 1500 grams of n-hexane to give a trianhydride having the following formula:

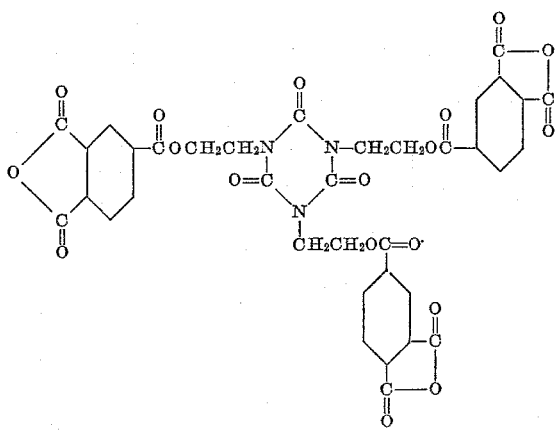

In similar fashion the corresponding trianhydrides can be prepared by (1) heating the triacetate of tris 2-hydroxyethyl isocyanurate with trimellitic anhydride or (2) heating the triacetate of tris 2-hydroxybutyl isocyanurate with trimellitic anhydride.

What is claimed is:
1.

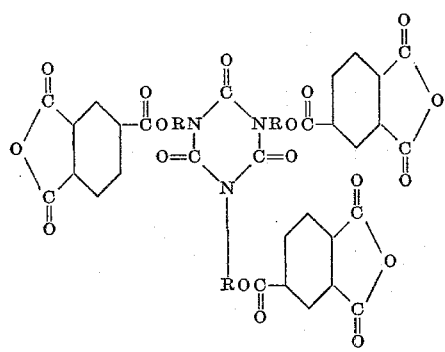

where R is a lower alkylene radical having at least one carbon atom.

2. A compound according to claim 1 where R has the formula $C_nH_{2n}$ and $n$ is an integer of 2 to 4 inclusive.

3.

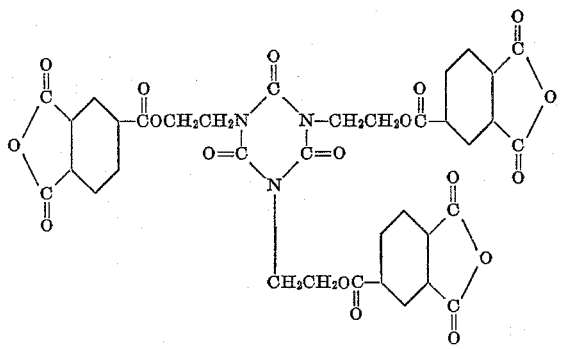

References Cited by the Examiner
UNITED STATES PATENTS 3,140,299    7/1964    Loncrini  ---------- 260—346.3
3,182,073    5/1965    Loncrini  ---------- 260—346.3

WALTER A. MODANCE, *Primary Examiner.*

J. M. FORD, *Assistant Examiner.*